United States Patent [19]

Oschmann

[11] Patent Number: 4,656,757
[45] Date of Patent: Apr. 14, 1987

[54] METHOD AND PLANT FOR THE DESICCATION OF DRYING GAS

[76] Inventor: Klaus Oschmann, Mitterweg 9, D-8066 Bergkirchen, Fed. Rep. of Germany

[21] Appl. No.: 740,903
[22] PCT Filed: Oct. 4, 1984
[86] PCT No.: PCT/EP84/00306
 § 371 Date: Jun. 26, 1985
 § 102(e) Date: Jun. 26, 1985
[87] PCT Pub. No.: WO85/01569
 PCT Pub. Date: Apr. 11, 1985

[30] Foreign Application Priority Data

Oct. 4, 1983 [DE] Fed. Rep. of Germany ....... 3336048

[51] Int. Cl.⁴ .............................................. F26B 3/06
[52] U.S. Cl. .......................................... 34/27; 34/50; 34/80; 55/20; 55/34; 55/163
[58] Field of Search .................... 34/26, 27, 32, 72, 79, 34/80, 50; 55/20, 33, 34, 163

[56] References Cited

U.S. PATENT DOCUMENTS

| | | | |
|---|---|---|---|
| 2,570,974 | 10/1951 | Neuhart | 34/13 |
| 2,799,362 | 7/1957 | Miller | 55/34 |
| 3,080,692 | 3/1963 | Staley et al. | 55/34 |
| 3,130,021 | 4/1964 | Milton | 55/33 |
| 4,197,095 | 4/1980 | White et al. | 55/20 |
| 4,351,649 | 9/1982 | Owens et al. | 55/162 |
| 4,413,426 | 11/1983 | Graff | 34/27 |

FOREIGN PATENT DOCUMENTS 3145921 7/1983 Fed. Rep. of Germany .
930143 1/1948 France .

Primary Examiner—Albert J. Makay
Assistant Examiner—David W. Westphal
Attorney, Agent, or Firm—Cohen, Pontani & Lieberman

[57] ABSTRACT

A method and apparatus for removing moisture from a drying gas serving for the drying of solids, in particular granular plastics (10), which gas is dried in an adsorption drying agent after passing through the substance, then heated and finally conducted again through the substance to be dried. A first bed (32a) of drying agent in which the drying agent is utilized until complete saturation is connected in series with a following second bed (32b) of drying agent in which the drying agent is utilized only up to partial saturation. Behind the second bed (32b) of drying agent, a partial stream of the drying gas is conducted through a third bed (32c) of drying agent which has been regenerated in the meantime, while the other partial stream is conducted into the drying container 12, bypassing the third bed (32c) of drying agent. A fourth bed (32d) of drying agent is regenerated in each case. The four beds of drying agent can be exchanged for each other.

8 Claims, 7 Drawing Figures

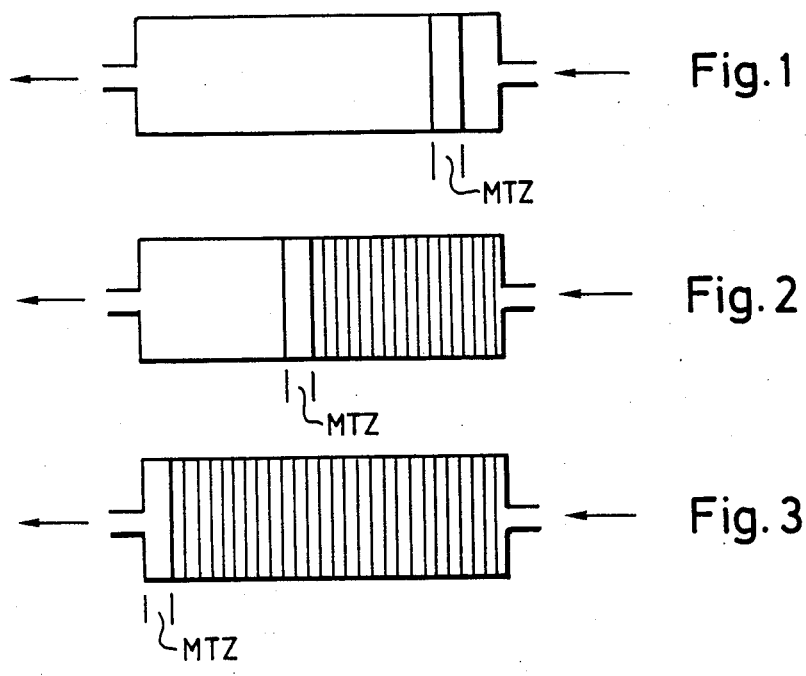

METHOD AND PLANT FOR THE DESICCATION OF DRYING GAS

BACKGROUND OF THE INVENTION

The present invention relates to a method of removing moisture from a drying gas used for the drying of solid substances, in particular granular plastics. The gas, after flowing through the substance, is dried in an adsorption drying agent and thereafter heated and finally reconducted through the substance to be dried, while the adsorption drying agent, after it has reached a given moisture content, is replaced by a drying agent which has been regenerated in the meantime. The moisture laden adsorption drying agent is then, in its turn, regenerated by the application of heat.

The invention furthermore relates to an apparatus for removing moisture from a drying gas used for the drying of solid substances, particularly granular plastics, the apparatus having at least two beds of drying agent through which the drying gas flows. A drying-gas line is leading from the beds to the substance to be dried.

A method and an apparatus of the above type are described and shown in German Offenlegungsschrift DE-OS 31 45 921. In that case, two beds of drying agent are provided, one of which is flown through by the drying gas until the gas has reached a given moisture content at the outlet from the bed of drying agent; the drying gas is then conducted via a switching arrangement, through the bed of drying agent which has been regenerated in the meantime so that the first bed of drying agent which has in the meantime become saturated can then be regenerated.

As drying agents molecular sieves are generally used, for instance crystalline metal aluminosilicates or the like which are capable of absorbing moisture up to a maximum of approximately 20% by weight of the drying agent. The transfer of the moisture from the drying gas to the molecular sieves over a time period is shown diagrammatically in FIGS. 1 to 3. The transfer of the moisture takes place in the so-called mass transfer zone (MTZ). The mass transfer zone is that part of the bed of drying agent within which the moisture content of the drying agent is reduced from the inlet concentration to the outlet concentration. A freshly regenerated bed of drying agent is shown in FIG. 1. Upon increasing saturation of a part of the bed the mass transfer zone travels, as shown in FIG. 1, towards the outlet of the bed. When, as shown in FIG. 3, the mass transfer zone has reached the end of the bed of drying agent the optimum dew point is exceeded. If the drying agent, however, is utilized up to its maximum adsorption capacity (FIG. 3) there is the disadvantage that the drying gas is excessively wet at its outlet from the bed of drying agent.

SUMMARY OF THE INVENTION

An object of the invention is to improve a method and apparatus of the aforementioned type so that the complete regeneration of the drying gas is possible despite complete utilization of the drying agent up to saturation.

In the method indicated, this object is achieved according to the invention by conducting the drying gas through a first bed of drying agent and then through a second bed of drying agent which takes the place of the first bed of drying agent when the latter has become fully saturated. While the saturated first bed of drying agent is being regenerated, the second bed of drying agent is replaced by a third bed of drying agent which has been regenerated in the meantime.

In the apparatus of the above-indicated type, the object is achieved in the manner that a first bed of drying agent is connected by a connecting line in series with a following second bed of drying agent and that a dew-point measurement sensor is connected in the main line behind the second bed of drying agent, said measurement sensor being connected with a control circuit which actuates a switching device which substitutes the second bed of drying agent for the first bed of drying agent when the latter has become fully saturated.

As a result of the measures provided by the invention the first bed of drying agent is utilized up to its saturation limit and employed for pre-drying, while the complete drying takes place in the following second bed of drying agent. In this way the adsorption of moisture by the drying agent is doubled as compared with the previously known systems, without any additional expense for apparatus or energy being necessary as a result of this. Since the number of required regenerations is greatly reduced by the greater loading capability of the drying agent, the additional advantage obtained is an increase in the life of the drying agent.

As a further development of the method, it is contemplated that a partial stream of the drying gas be conducted, behind the second bed of drying agent, through the third bed of drying agent which has been thermally regenerated in the meantime and is then returned, behind said third bed, back to the mainstream of gas which has bypassed the third bed of drying agent and is conducted to the substance to be dried.

In another embodiment of the apparatus of the present invention, behind the second bed of drying agent, a bypass line branches off from the main line leading to the substance to be dried and leads through a third bed of drying agent which is connected in parallel to the main line.

In this fashion, the freshly regenerated third bed of drying agent is utilized in two ways since, first, the heat present as a result of the previously effected regeneration is utilized to heat a part of the drying gas which is conducted to the substance to be dried while, secondly, the bed of drying agent is cooled by this removal of heat, as is necessary for the following removal of moisture from the drying gas.

Since during regeneration the heating of the drying agent and of the metal parts until the moisture is evaporated requires the greatest expenditure of energy while the expenditure of energy for the evaporation itself is, however, only slight, this manner of operation results in a great saving as a result of fewer regeneration processes and thus smaller consumption of energy.

BRIEF DESCRIPTION OF THE DRAWINGS

Advantageous further embodiments of the invention can be derived from the dependent claims and from the following description of an illustrative embodiment shown in the drawing, in which:

FIGS. 1 to 3 show the above-described course of the process in a bed of adsorption drying agent.

DETAILED DESCRIPTION OF PRESENTLY PREFERRED EMBODIMENTS

Figure 4:
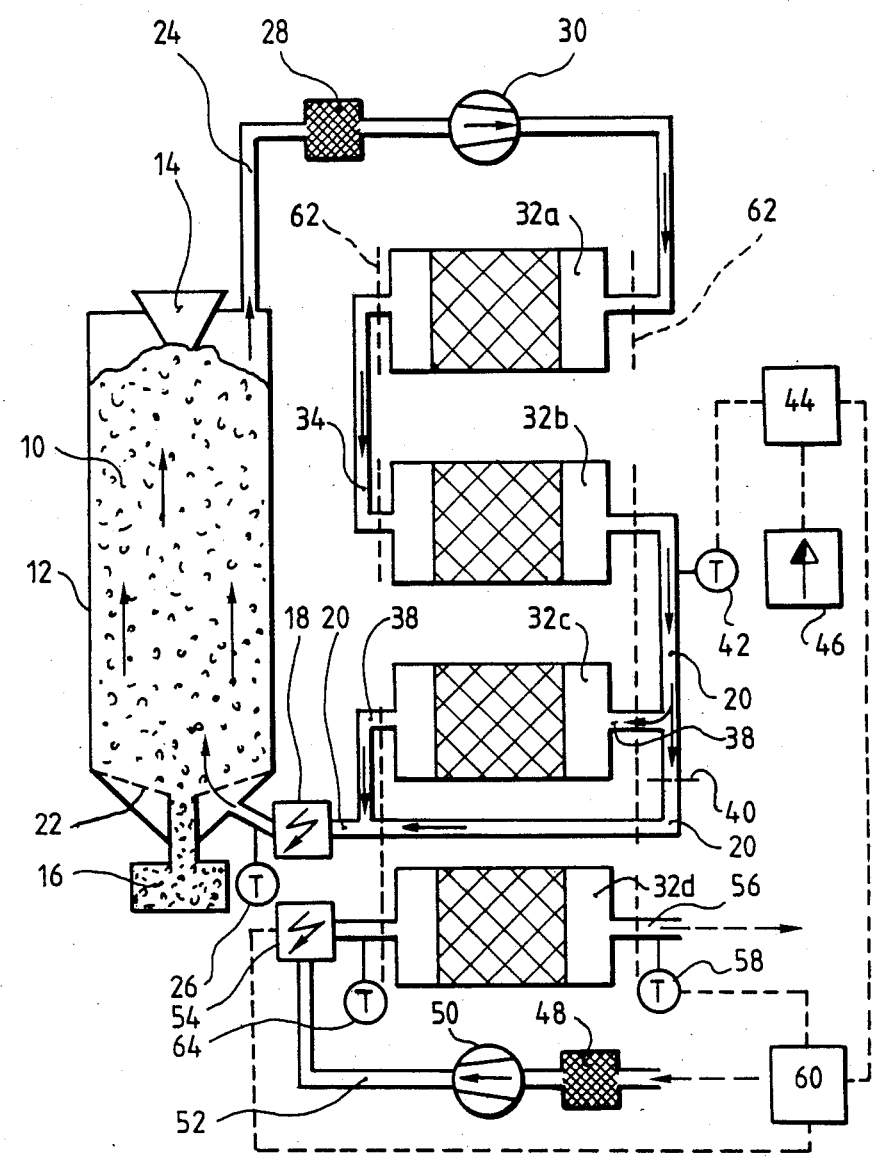
FIG. 4 shows, schematically, an apparatus for removing moisture from drying gas in accordance with the invention.

FIG. 4 shows schematically an apparatus for the drying of granular plastics (granulate 10) which are introduced into a drying container 12. An upper filling opening 14 serves for the introducing of the material to be dried into the drying container 12, while a discharge opening 16 is provided at the bottom for the removal of the dried substance.

A main line 20 for the feeding of a drying gas discharges into the lower part of the drying container 12 via a drying-gas heater 18, the drying gas discharging into the lower region of the drying container 12 through a screen bottom 22 into the granulate 10. The heated drying gas, which is generally air but may also be an inert gas, nitrogen or the like, flows through the granulate 10 from the bottom to the top, whereupon it leaves the drying container 12 through a discharge line 24.

A thermostat 26 is provided to assure that the temperature of the drying gas flowing within the drying container 12 remains constant at all times, it being connected electrically, in a manner not shown in the drawing, to the drying-gas heater 18.

The discharge line 24 passes through a filter 28 which retains particles of dust and then leads to a blower 30 which blows the moist drying gas into a first bed 32a of drying agent.

The first bed 32a of drying agent is connected in series via a connecting line 34, with a subsequent second drying agent bed 32b. From the outlet of the second drying agent bed 32b, the main line 20 passes, via the drying-gas heater 18, into the drying container 12 while a bypass line 38 extends through a third, previously regenerated drying agent bed 32c. The bypass line 38 discharges behind the third bed 32c of drying agent, back into the main line 20. A throttle 40, for instance a diaphragm, is connected in the main line 20 past the place of branching of the bypass line 38 and is so dimensioned that the partial stream through the third drying agent bed 32c is smaller than the main stream which bypasses it. The absorption of heat (still to be described) in the third bed 32c of drying agent is therefore only so great that heating of the drying gas for the control of the temperature can still take place if necessary in the drying gas heater 18.

Behind the second drying agent bed 32b there is connected in the main line 20 a dew point measurement sensor 42 which is electrically connected to a control circuit 44, which actuates a switching device 46, the function of which will be explained below.

The saturated adsorption drying agent is regenerated in a fourth bed 32d of drying agent. For this purpose, outside air is drawn in by a blower 50 via a filter 48 and conducted, via a line 52 and an air heater 54, into the fourth bed 32d of drying agent. In this bed, the drying agent is regenerated by the stream of hot air. As soon as the drying agent in the fourth bed 32d of drying agent is completely dry, the temperature in the off-gas line 56 suddenly increases, since the part of the heat produced by the air heater 54, which was previously required for the evaporation of the adsorbed water, is now free, in addition, for heating the stream of hot air. Since, however, cooling is to take place after the complete drying of the drying agent, a thermostat 58, inserted in the off-gas line 56, sends a signal, upon the occurrence of said temperature jump, to a switch means 60 which then disconnects the air heater 54 and, after a certain period of time, also the blower 50.

A desired degree of moisture can be set at the control circuit 44, said degree of moisture corresponding here to the complete saturation of the adsorption drying agent. As soon as the pre-set effective moisture content has been reached in the dew point measurement sensor 42 in the main line 20 and it is noted that the desired dew point has thus been exceeded, the first bed 32a of drying agent is completely saturated and the mass transfer zone has traveled out of it into the second bed 32b of drying agent. The control circuit 44 now actuates the switching device 46 which now opens couplings 62 shown in dashed lines, between the four drying agent beds 32a, 32b, 32c, 32d as well as the lines extending into and out of said beds. The drying agent beds are then shifted in the direction indicated by the arrow contained in the switching device 46 so that the drying agent bed 32d which has been regenerated in the meantime takes the place of the drying agent bed 32c, while the latter takes the place of the drying agent bed 32b. The only partially saturated drying agent bed 32b takes the place of the completely saturated drying agent bed 32a, which in its turn assumes the previous position of the drying agent bed 32d in order to be regenerated there.

After this switching, the couplings 62 are again closed so as to connect the drying agent beds tightly to the corresponding inlet and outlet lines.

After the above-described switching, the merely partially saturated drying agent bed 32b, which is now in the uppermost position shown in FIG. 4, is used for drying the drying gas until said bed is also again completely saturated.

The third drying agent bed 32c, which had previously been regenerated at the lowest position in FIG. 4, is utilized for preheating a part of the stream of drying gas, as a result of which said bed is simultaneously cooled.

The control circuit 44 is connected electrically to the switch means 60, since at the start of a new regeneration of the drying agent bed 32d the air heater 54 must again be switched on. A thermostat 64 assures that the hot air produced by the air heater 54 has the required temperature.

Figure 5:
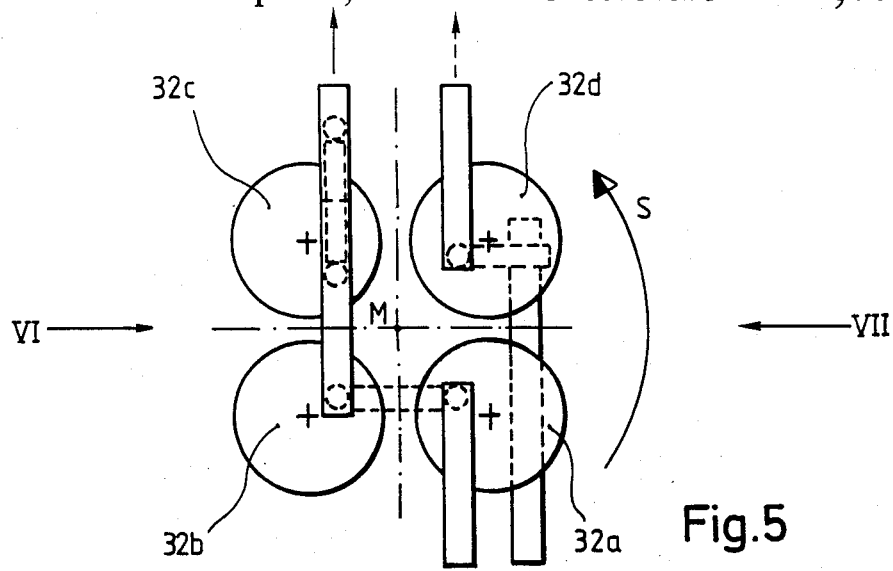
FIG. 5 shows schematically one practical embodiment having a carousel arrangement.

FIG. 5 shows schematically one practical embodiment in which the four beds of drying agent 32a, 32b, 32c and 32d are fastened in a circle on a carousel, not shown in detail, which can be turned in the direction indicated by the arrow in steps of 90° each via the switching means 46 shown in FIG. 4. The couplings 62, which are indicated by dashed lines in FIGS. 6 and 7, can consist for instance of known rotary slide valves.

Figure 6:
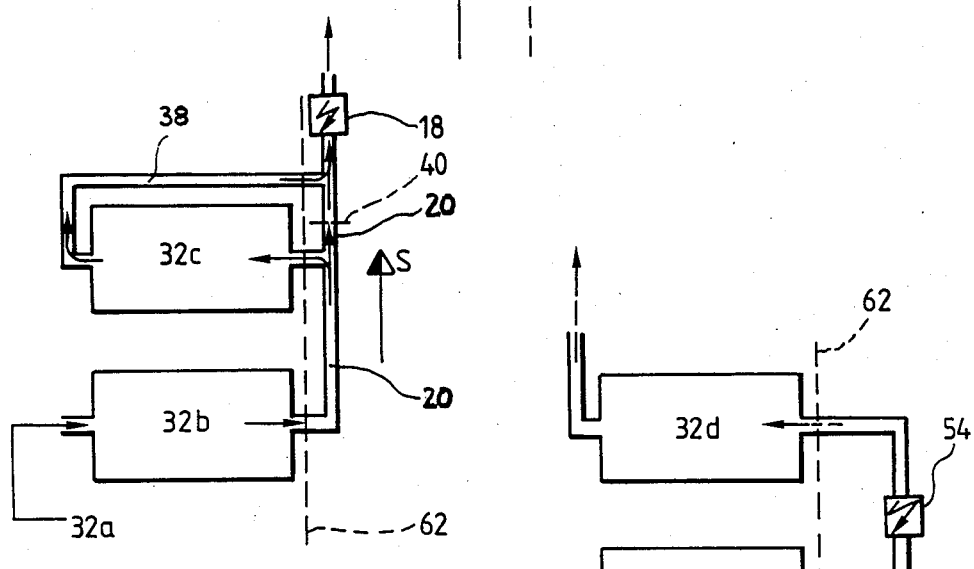
FIG. 6 is a schematic side view, seen in the direction indicated by the arrow VI in FIG. 5.

The side view of FIG. 6 shows the second, only partially saturated drying agent bed 32b from which a part of the stream of the drying gas from which the moisture has been removed flows, via the line 38, into the third drying agent bed 32c, while the other part of the stream is fed, via the throttle 40 in the main line 20, immediately to the drying-gas heater 18 and then to the drying container 12.

Figure 7:
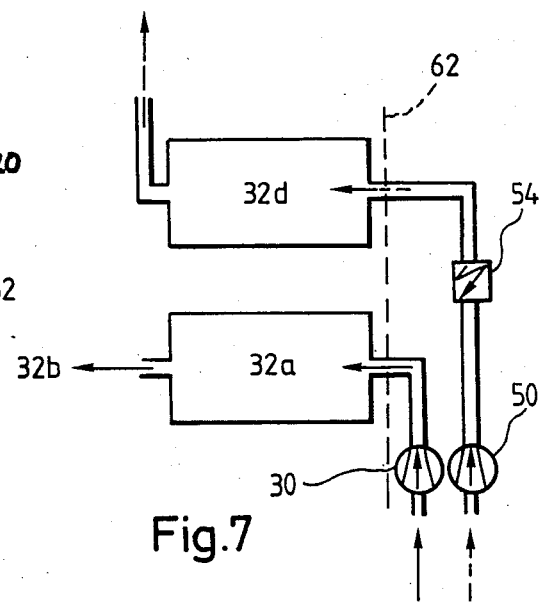
FIG. 7 is a schematic side view seen in the direction of the arrow VII in FIG. 5.

The side view of FIG. 7 shows the first drying agent bed 32a, whose outlet leads to the second drying agent bed 32b. The fourth drying agent bed 32d for the regeneration is shown schematically.

As a modification of the embodiment shown in FIG. 4, it is also possible to connect the dew point measurement sensor 42 with the connecting line 34 in order to directly determine the saturation of the first drying agent bed 32a. However, since the moisture of the drying gas behind the second drying agent bed 32b in any event is of interest, it is more cost-favorable to connect the dew point measurement sensor 42, as in FIG. 4, behind the second bed 32b of drying agent and to draw conclusions at this point as to the moisture content of the drying agent at the outlet from the first drying agent bed 32a.

As a further embodiment of the invention, it is also possible to divide the column of drying agent not merely into two drying agent beds 32a, 32b but into three or more such beds.

While I have described the preferred embodiments of the invention and have suggested various modifications therein, other changes and modifications may be made therein within the scope of the appended claims without departing from the spirit and scope of this invention.

What is claimed is:

1. In a method of removing moisture from a drying gas used for the drying of solid substances, particularly granular plastics, in which the gas after flowing through the substance is dried in an adsorption drying agent, thereafter heated and finally conducted through the substance to be dried, and in which the adsorption drying agent, after it has reached a given degree of moisture, is replaced by a newly regenerated drying agent while it is itself regenerated by the application of heat, the improvement comprising:
   (a) conducting said drying gas sequentially through a first bed of drying agent and through a second bed of drying agent;
   (b) dividing said gas stream after the second bed of drying agent into a first and second partial gas stream;
   (c) conducting said first partial gas stream of the drying gas, behind the second bed of drying agent, through a newly regenerated third bed of drying agent;
   (d) thereafter returning said first gas stream, behind said third bed, to said second partial stream of gas which has bypassed said third bed of drying agent;
   (e) conducting said united gas streams to the substance to be dried;
   (f) regenerating a fourth bed of drying agent with a heating medium; and
   (g) replacing said four beds of drying agent in constant sequence upon complete saturation of said first bed of drying agent.

2. The method of claim 1, wherein the feeding of heat to the bed of drying agent during regeneration step (f) is interrupted as soon as the temperature of the heating medium increases substantially behind the bed of drying agent.

3. In an apparatus for removing moisture from a drying gas used for the drying of solid substances having four beds of drying agent, the beds being exchangeable for each other in constant sequence, and the respective fourth bed of drying agent being regenerated by a heating medium; the improvement comprising:
   (a) the first bed of drying agent being connected in series to the second bed of drying agent;
   (b) a main line leading from said second bed to said substance to be dried;
   (c) a bypass line branching off said main line behind said second bed of drying agent and extending via the third bed of drying agent and connecting said third bed in parallel to said main line; and
   (d) a dew point measurement sensor operatively connected to said main line behind said second bed of drying agent, said sensor being connected to a control unit, said control unit actuating a switching means upon complete saturation of the first bed of drying agent for replacing said first bed by said second bed of drying agent.

4. The apparatus of claim 3, further comprising a throttle in said main line behind said branching point of said bypass line.

5. The apparatus of claim 4, further comprising:
   (a) a thermostat connected to the off-gas line of the fourth bed of drying agent;
   (b) an air heater; and
   (c) switching means connecting said thermostat to said air heter for disconnecting said air heater upon a sudden temperature increase.

6. The apparatus of claim 3, wherein the four drying agent beds are arranged in a circle on a carousel, the carousel being adapted to be turned in steps of 90° by switching means and being further adapted to be coupled by a rotary slide valve with the corresponding lines and connecting lines.

7. The apparatus of claim 4, wherein the four drying agent beds are arranged in a circle on a carousel, the carousel being adapted to be turned in steps of 90° by switching means and being further adapted to be coupled by a rotary slide valve with the corresponding lines and connecting lines.

8. The apparatus of claim 5, wherein the four drying agent beds are arranged in a circle on a carousel, the carousel being adapted to be turned in steps of 90° by switching means and being further adapted to be coupled by a rotary slide valve with the corresponding lines and connecting lines.

* * * * *